US006798793B2

United States Patent
Harada et al.

(10) Patent No.: US 6,798,793 B2
(45) Date of Patent: Sep. 28, 2004

(54) PASSIVELY MODELOCKED FIBER LASER

(75) Inventors: Shinichi Harada, Aichi-ken (JP); Makoto Yoshida, Aichi-ken (JP)

(73) Assignee: Aisin Seiki Kabushiki Kaisha, Aichi-ken (JP)

(*) Notice: Subject to any disclaimer, the term of this patent is extended or adjusted under 35 U.S.C. 154(b) by 14 days.

(21) Appl. No.: 10/395,280

(22) Filed: Mar. 25, 2003

(65) Prior Publication Data
US 2003/0219044 A1 Nov. 27, 2003

(30) Foreign Application Priority Data
Mar. 25, 2002 (JP) ......................................... 2002-082518

(51) Int. Cl.[7] ........................... H01S 3/30; H01S 3/098
(52) U.S. Cl. ............................................. 372/6; 372/18
(58) Field of Search ................. 372/6, 17–18, 372/703

(56) References Cited

U.S. PATENT DOCUMENTS

| | | | | | |
|---|---|---|---|---|---|
| 5,689,519 | A | * | 11/1997 | Fermann et al. | 372/18 |
| 5,701,319 | A | * | 12/1997 | Fermann | 372/18 |
| 5,923,686 | A | * | 7/1999 | Fermann et al. | 372/18 |
| 6,275,512 | B1 | * | 8/2001 | Fermann | 372/6 |
| 2002/0172486 | A1 | * | 11/2002 | Fermann | 385/128 |
| 2003/0147579 | A1 | * | 8/2003 | Hammer | 385/11 |

* cited by examiner

Primary Examiner—Don Wong
Assistant Examiner—Phillip Nguyen
(74) Attorney, Agent, or Firm—Sughrue Mion, PLLC

(57) ABSTRACT

A passively modelocked fiber laser includes a laser diode generating laser energy, a wavelength splitter guiding the laser energy generated at the laser diode to a cavity part, and a gaining medium for amplifying the laser energy in the cavity part. The passively modelocked fiber laser further includes a reflecting means for reflecting the laser energy along an optical axis passing through the gaining medium, an output means for outputting the laser energy generated in the cavity part, and a fiber isolator provided between the laser diode and the wavelength splitter. In the passively modelocked fiber laser, the fiber isolator is composed of an optical fiber having a curved shape and including a core for propagating the laser energy, a clad for coating the core, and an optical absorption film for coating the clad.

5 Claims, 2 Drawing Sheets

PASSIVELY MODELOCKED FIBER LASER

CROSS REFERENCE TO RELATED APPLICATIONS

The application is based on and claims priority under 35 U.S.C. §119 with respect to a Japanese Patent Application 2002-082518, filed on Mar. 25, 2002, the entire content of which is incorporated herein by reference.

FIELD OF THE INVENTION

This invention generally relates to a passively modelocked fiber laser capable of providing an extra-short pulse, and more particularly, this invention pertains to a fiber isolator which removes a return laser beam returning from a cavity part to a laser diode.

BACKGROUND OF THE INVENTION

A typical passively modelocked fiber laser is shown in FIG. 3. The passively modelocked fiber laser is mainly composed of a pump part 20 and a cavity part 30. The pump part 20 includes a laser diode 21 which generates a laser beam (laser energy) with a wavelength of 980 nm as an excitation light, a fiber isolator 22, and a single mode fiber 23 which propagates the laser beam generated at the laser diode 21 to the fiber isolator 22. The cavity part 30 includes a wavelength splitter 31 which guides the laser beam with the wavelength of 980 nm from the pump part 20, an erbium doped fiber 32 (a gaining medium) which amplifies the laser beam with a wavelength of 1560 nm by the excitation light having the wavelength of 980 nm, and a pair of metallic mirrors 33 and 34 (a reflecting means) which reflects a laser beam in the cavity part 30.

The cavity part 30 further includes collimator optical systems 35 and 36 which form an optical path between the metallic mirrors 33 and 34, a beam splitter 37 (an output means) which outputs the laser beam with the wavelength of 1560 nm, and a single mode fiber 38 which propagates the laser beam with the wavelength of 1560 nm between the wavelength splitter 31 and the collimator optical system 36. Propagation between the pump part 20 and the cavity part 30 is performed by a single mode fiber 24.

The laser beam with a wavelength of 980 nm generated at the laser diode 21 is propagated as single mode propagation because of the single mode fibers 23, 24, and 38 propagating a laser beam with a cutoff wavelength or larger than the cutoff wavelength. The laser beam guided by the wavelength splitter 31 is amplified to the laser beam with the wavelength of 1560 nm at the erbium doped fiber 32.

Part of a return laser beam (1560 nm) which returns to the fiber isolator 22 via the single mode fiber 24 from the cavity part 30 is discharged out of an optical fiber (not shown) which is part of the fiber isolator 22, or total internal reflection of the return laser beam (1560 nm) within the optical fiber is not generated and the return laser beam leaks outside. Consequently, the return laser beam incident on the laser diode 21 and with a wavelength of 1560 nm can be prevented by an inexpensive device as well as a downsized device.

However, in the conventional fiber isolator 22, all of the return laser beam is not discharged from the optical fiber, and part of the return laser beam returns to a core of the fiber within isolator 22 by being reflected on a boundary part between the optical fiber and the outside. Additionally, part of a laser beam once discharged outside is affected by a wavelength absorption characteristic of a coating, or some other apparatus, located on or around the optical fiber. For example, protected by a white coated tube, the laser beam leaking from the optical fiber is reflected by the white coated tube, returns to the inside of the optical fiber again, and is incident on the laser diode 21. When a return laser beam returning to a fiber isolator is incident on a laser diode, the following problems may arise; unsteady oscillation of a laser beam at a laser diode, dropping of signal-to-noise (S/N) ratio of a laser beam which has to be guided, or deterioration of the $M^2$ factor. The $M^2$ factor is an international standard for evaluating quality of a laser beam quantitatively.

The present invention, therefore, seeks to provide an improved passively mode locked fiber laser capable of solving the foregoing problems, for example, unsteady oscillation of a laser beam, the reduction of S/N ratio, and the deterioration of the $M^2$ factor, when a return laser beam is incident on a laser diode.

SUMMARY OF THE INVENTION

According to an aspect of the present invention, a passively modelocked fiber laser includes a laser diode generating laser energy, a wavelength splitter guiding the laser energy generated at the laser diode to a cavity part, and a gaining medium for amplifying the laser energy in the cavity part. The passively modelocked fiber laser further includes a reflecting means, such as the mirrors shown in FIG. 3, for reflecting the laser energy along an optical axis passing through the gaining medium, an output means, such as the beam splitter 37 shown in FIG. 3, for outputting the laser energy generated in the cavity part, and a fiber isolator provided between the laser diode and the wavelength splitter. In the foregoing passively modelocked fiber laser according to the invention, the fiber isolator has an optical fiber having a curved shape. The optical fiber includes a core for propagating the laser energy, a clad for coating the core, and an optical absorption film for coating the clad.

According to another aspect of the present invention, the optical fiber has a coiled shape, and a value of a refractive index of the optical absorption film is equal to or greater than a value of a refractive index of the clad.

BRIEF DESCRIPTION OF THE DRAWINGS

The foregoing and additional features and characteristics of the present invention will become more apparent from the following detailed description considered with reference to the accompanying drawing figures, in which.

DETAILED DESCRIPTION OF THE INVENTION

An embodiment of a passively modelocked fiber laser including a fiber isolator according to the present invention and capable of providing an extra-short pulse is described in sequence with reference to the attached drawing figures.

Figure 1:
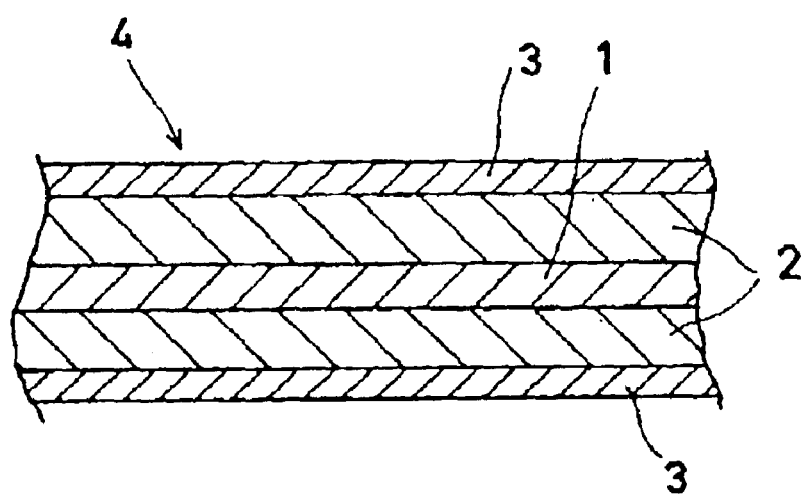
FIG. 1 is a cross sectional view of an optical fiber according to an embodiment of the present invention.

FIG. 1 shows a cross sectional view of an optical fiber 4 which can be provided as a fiber isolator 22 (FIG. 3) composing the passively modelocked fiber laser according to the present invention. The optical fiber 4 is composed of a core 1 for propagating a laser beam, a clad 2 for coating the core 1, and an optical absorption film 3 for coating the clad 2. The core 1 and the clad 2 are made of a silica-based material, and a refractive index of the core 1 is larger than an index of the clad 2. A refractive index of the optical absorption film 3 is larger than the index of the clad 2.

The optical absorption film 3 according to this embodiment is an acrylic black-colored film and has a film thickness between 10 μm and 50 μm. In this embodiment of the invention, the acrylic black-colored film or the optical absorption film 3 is formed around the clad 2 on an existing optical fiber by using a spray device. However, a method for forming a film is not limited to the above-described method. For example, a method for immersing the optical fiber 4 in an acrylic coating material and forming a film by vacuum deposition may be applied.

Figure 2:
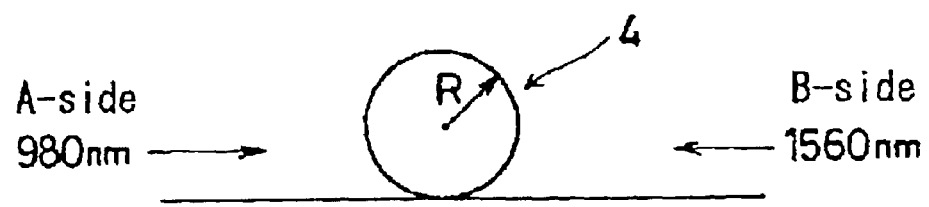
FIG. 2 is a partial view of the optical fiber composing a fiber isolator in accordance with the present invention.
Figure 3:
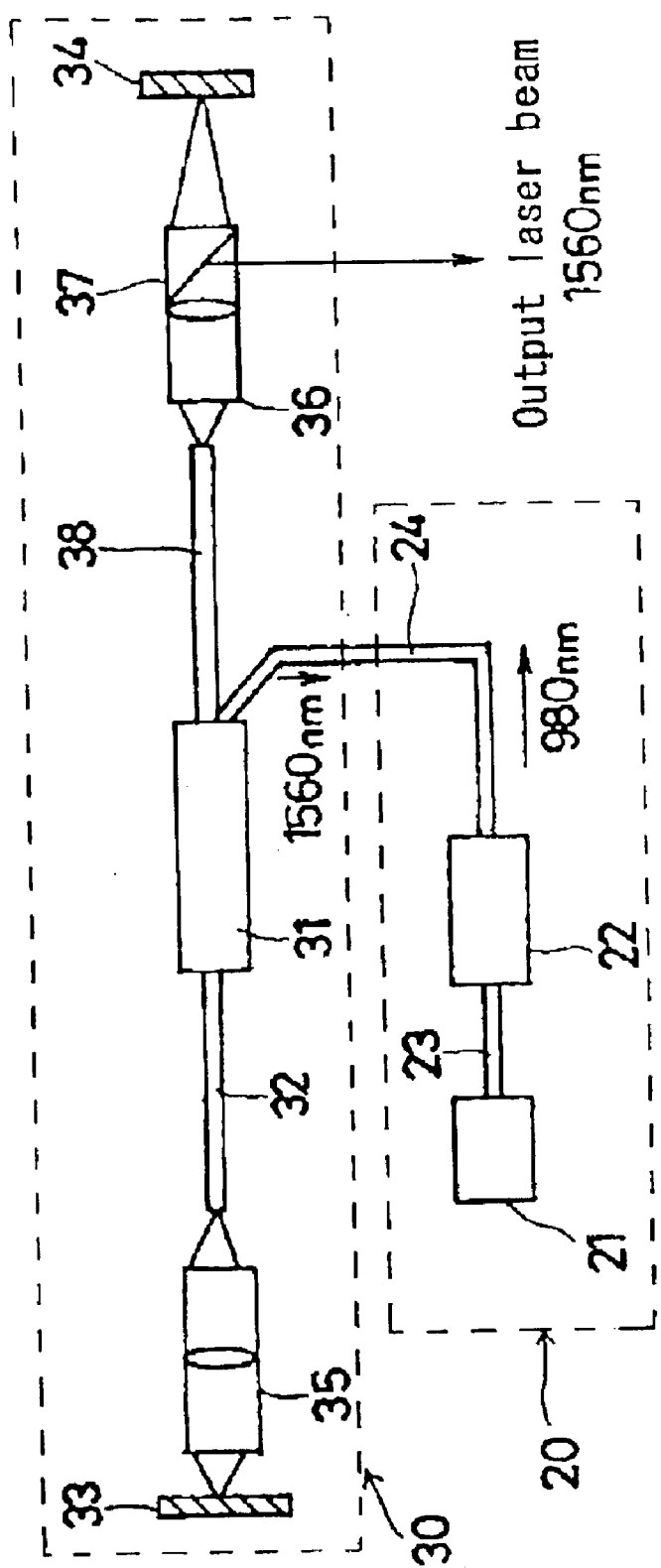
FIG. 3 is a schematic view of a typical passively modelocked fiber laser construction in accordance both with conventional fiber lasers and a fiber laser in accordance with the present invention.

The acrylic black-colored film has a characteristic of absorbing a laser beam with a wavelength of 1200 nm or more, in a laser beam leaking from the coiled optical fiber 4 (FIG. 2). Consequently, the acrylic black-colored film also has a characteristic of absorbing a laser beam with a wavelength of 1560 nm. The laser beam with the wavelength of 1560 nm, as shown in FIG. 3, returns to the fiber isolator 22 from a cavity part 30 via an optical fiber 24 and is discharged around the coiled (FIG. 2) optical fiber 4, functioning as isolator 22.

In this embodiment of the invention, the acrylic black-colored film is applied to absorb the return laser beam with the wavelength of 1560 nm. For example, when single mode propagation with a wavelength in the visible range between 400 nm and 500 nm is operated by an optical fiber with a cutoff wavelength of 370 nm or less, pigment such as magenta, cyan-colored dye may be used as the coating. The pigment is capable of absorbing a laser beam with a wavelength of 600 nm or more. More specifically, a film, which is capable of absorbing a laser beam with a wavelength larger than a wavelength of a laser beam which has to be propagated in a single mode by 100 nm or more, may be applied.

FIG. 2 shows an embodiment of the optical fiber 4 according to the present invention. The optical fiber 4 is provided as the fiber isolator 22 and has a coiled shape. A curvature radius R of the coil is constant, for example approximately 5 mm. As shown in FIGS. 2 and 3, an A-side of the optical fiber 4 is connected to a laser diode 21, and a B-side is connected to a wavelength splitter 31 composing the cavity part 30. A laser beam with a wavelength of 980 nm is incident on the optical fiber 4 from the A-side and propagated to the B-side, connected to the wavelength splitter 31 of the cavity part 30, via the optical fiber 4.

The return laser beam with the wavelength of 1560 nm, which returns from the wavelength splitter 31 of the cavity part 30, is incident on the optical fiber 4 from the B-side, but most of the return laser beam is discharged outside from the coiled part of the optical fiber 4. In the optical fiber 4 according to this embodiment, when the laser beam with the wavelength of 980 nm is incident on the optical fiber 4 from the A-side, a value of an insertion loss with respect to the B-side is 0.25 db. On the other hand, when the laser beam with a wavelength of 1560 nm is incident from the B-side of fiber 4, a value of an insertion loss with respect to the A-side is 90 db or more.

By coating the clad 2 of the optical fiber 4 with the optical absorption film 3, part of the return laser beam returning from the cavity part 30 to the A-side of the optical fiber 4 composing the fiber isolator 22 via the single mode fiber 24 is discharged outside from the coiled part (i.e., the curved shape) of the optical fiber 4, and a remaining laser beam not discharged outside and returning to the core 1 by reflecting can be absorbed by the optical absorption film 3. Consequently, the remaining laser beam incident on the laser diode 21 again as a noise beam can be prevented.

According to one embodiment, the curvature of the coiled part, for example, the coiled shape, of the optical fiber 4 is constant. The return laser beam with a certain wavelength (frequency) returning again from the cavity part 30 to the fiber isolator 22 via the single mode fiber 24 can be discharged outside by a certain curvature of the coiled part of the optical fiber 4 or by total internal reflection of the return laser beam being not generated. Consequently, when the curvature of the coiled part of the optical fiber 4 is constant, a laser beam with any frequency propagated within the core 1 can be discharged outside of the optical fiber 4.

When a refractive index of the optical absorption film 3 is larger than an index of the clad 2, most of the return laser beam returning from the cavity part 30 to the fiber isolator 22 via the single mode fiber 24 can be discharged outside of the optical fiber 4 by the optical absorption film 3. Because of an angle difference of the total internal reflection between the clad 2 and the optical absorption film 3, most of the return laser beam passing through the optical absorption film 3 from the clad 2 can be discharged.

Additionally, most of a laser beam returning to the core 1 of the optical fiber 4 from the outside through the optical absorption film 3 is reflected or absorbed by the optical absorption film 3 because of a difference in the respective refractive indices. The difference in the refractive indices is, for example, such that a refractive index of the optical absorption film 3 is different from a refractive index of the air around the optical absorption film 3 (a refractive index of the air is smaller than a refractive index of the optical absorption film 3). Consequently, the return laser beam incident on the laser diode 21 or the core 1 for propagating the laser beam can be prevented.

According to the present invention, a return laser beam incident on a laser diode can be prevented. Accordingly, the following problems can be solved; unsteady oscillation of a laser beam at a laser diode, reduction of the S/N ratio of a laser beam which has to be guided, and deterioration of the $M^2$ factor.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit and scope of the present invention. Accordingly, it is expressly intended that all such variations, changes and equivalents which fall within the spirit and scope of the present invention as defined in the claims, be embraced thereby.

What is claimed is:

1. A passively modelocked fiber laser, comprising:
    a laser diode generating laser energy;
    a wavelength splitter guiding the laser energy generated at the laser diode to a cavity part;
    a gaining medium for amplifying the laser energy in the cavity part;
    a reflecting means for reflecting the laser energy along an optical axis passing through the gaining medium;

an output means for outputting the laser energy generated in the cavity part; and a fiber isolator provided between the laser diode and the wavelength splitter, wherein the fiber isolator comprises an optical fiber having a curved shape and which further comprises a core operable to propagate the laser energy, a clad coating the core, and an optical absorption film coating the clad.

2. A passively modelocked fiber laser, according to claim 1, wherein the optical fiber has a coiled shape.

3. A passively modelocked fiber laser, according to claim 1, wherein a value of a refractive index of the optical absorption film is equal to or greater than a value of a refractive index of the clad.

4. A passively modelocked fiber laser, according to claim 2, wherein a value of a refractive index of the optical absorption film is equal to or greater than a value of a refractive index of the clad.

5. A passively modelocked fiber laser according to claim 2, wherein a radius of curvature of the coiled fiber is constant.

* * * * *